United States Patent
Bendlin et al.

(10) Patent No.: US 11,032,721 B2
(45) Date of Patent: Jun. 8, 2021

(54) MINIMIZATION OF DRIVE TESTS IN BEAMFORMED WIRELESS COMMUNICATION SYSTEMS

(71) Applicant: AT&T Intellectual Property I, L.P., Atlanta, GA (US)

(72) Inventors: Ralf Bendlin, Cedar Park, TX (US); Thomas Novlan, Austin, TX (US); Arunabha Ghosh, Austin, TX (US); Saeed Ghassemzadeh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 106 days.

(21) Appl. No.: 15/783,810

(22) Filed: Oct. 13, 2017

(65) Prior Publication Data
US 2019/0116506 A1    Apr. 18, 2019

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/17* (2015.01); *H04B 17/318* (2015.01);
(Continued)

(58) Field of Classification Search
CPC ... H04W 24/02; H04W 24/08; H04W 64/003; H04B 17/318
See application file for complete search history.

(56) References Cited

U.S. PATENT DOCUMENTS

| | | |
|---|---|---|
| 6,269,092 B1 | 7/2001 | Schilling |
| 6,711,204 B2 | 3/2004 | Schilling |
| (Continued) | | |

FOREIGN PATENT DOCUMENTS

| | | |
|---|---|---|
| CN | 104507108 A1 | 4/2015 |
| EP | 2819454 A1 | 12/2014 |
| (Continued) | | |

OTHER PUBLICATIONS

"Making 5G NR a Reality", Qualcomm®, qualcomm.com, accessed Aug. 2017. 30 Pages.
(Continued)

*Primary Examiner* — Luat Phung

(57) ABSTRACT

An example method may include a processing system of a cellular network having a processor receiving, from a mobile endpoint device, a measurement of a performance indicator, a location, and spatial orientation information, the measurement of the performance indicator based upon at least one wireless signal from a base station of the cellular network, and adjusting at least one aspect of the cellular network in response to the measurement of the performance indicator, the location, and the spatial orientation information. Another example method may include a processing system of a mobile endpoint device having a processor receiving a wireless signal from a base station of a cellular network, capturing a measurement of a performance indicator based upon the wireless signal, recording a location and spatial orientation information, and transmitting to the cellular network the measurement of the performance indicator, the location, and the spatial orientation information.

19 Claims, 5 Drawing Sheets

(51) Int. Cl.
*H04W 24/08* (2009.01)
*H04W 64/00* (2009.01)
*H04W 24/10* (2009.01)
*H04B 17/17* (2015.01)

(52) U.S. Cl.
CPC ........... *H04W 24/08* (2013.01); *H04W 24/10* (2013.01); *H04W 64/003* (2013.01)

(56) References Cited

U.S. PATENT DOCUMENTS

| | | | |
|---|---|---|---|
| 8,179,824 B2 | 5/2012 | Seong et al. | |
| 8,289,863 B2 | 10/2012 | Vook et al. | |
| 8,351,411 B2 | 1/2013 | Kim et al. | |
| 8,463,298 B2 | 6/2013 | Kim et al. | |
| 8,531,937 B2 | 9/2013 | Levy | |
| 8,565,673 B2 | 10/2013 | Hu | |
| 8,599,945 B2 | 12/2013 | Sampath | |
| 8,655,348 B2 | 2/2014 | Zha et al. | |
| 8,660,015 B2 | 2/2014 | Issakov et al. | |
| 8,675,575 B2 | 3/2014 | Gong et al. | |
| 8,681,727 B2 | 3/2014 | Kinnunen et al. | |
| 8,873,408 B2 | 10/2014 | Siomina et al. | |
| 8,971,294 B2 | 3/2015 | Yan et al. | |
| 8,995,563 B2 | 3/2015 | Cho et al. | |
| 9,124,395 B2 | 9/2015 | Lin et al. | |
| 9,258,040 B2 | 2/2016 | Levy | |
| 9,264,928 B2 | 2/2016 | Liu et al. | |
| 9,270,438 B2 | 2/2016 | Lee et al. | |
| 9,295,044 B2 | 3/2016 | Novak et al. | |
| 9,300,495 B2 | 3/2016 | Dahlman et al. | |
| 9,332,443 B2 | 5/2016 | Xiao et al. | |
| 9,351,288 B2 | 5/2016 | Pi | |
| 9,351,315 B2 | 5/2016 | Bao et al. | |
| 9,414,371 B2 | 8/2016 | Pi et al. | |
| 9,420,584 B2 | 8/2016 | Blankenship et al. | |
| 9,439,086 B2 | 9/2016 | Emmanuel et al. | |
| 9,444,531 B2 | 9/2016 | Levy | |
| 9,444,596 B2 | 9/2016 | Chung et al. | |
| 9,455,772 B2 | 9/2016 | Zhang et al. | |
| 9,473,226 B2 | 10/2016 | Shattil | |
| 9,473,967 B2 * | 10/2016 | Zhang | H04W 4/06 |
| 9,496,609 B2 | 11/2016 | Marshall et al. | |
| 9,497,047 B2 | 11/2016 | Josiam et al. | |
| 9,510,314 B2 | 11/2016 | Schmidt et al. | |
| 9,537,623 B2 | 1/2017 | Zhang | |
| 9,629,122 B2 | 4/2017 | Yoon et al. | |
| 9,629,171 B2 | 4/2017 | Roy et al. | |
| 9,635,579 B2 | 4/2017 | Wang et al. | |
| 9,654,236 B2 | 5/2017 | Jeong et al. | |
| 9,730,151 B2 | 8/2017 | Jia et al. | |
| 9,980,230 B1 * | 5/2018 | Singh | H04W 52/0261 |
| 2009/0075679 A1 * | 3/2009 | Lin | H04W 52/0235 |
| | | | 455/458 |
| 2009/0274226 A1 | 11/2009 | Mondal et al. | |
| 2012/0214504 A1 * | 8/2012 | Zha | H04W 24/08 |
| | | | 455/456.1 |
| 2013/0114446 A1 * | 5/2013 | Liu | H04W 24/10 |
| | | | 370/252 |
| 2013/0122802 A1 * | 5/2013 | Wang | H04B 7/15535 |
| | | | 455/9 |
| 2013/0290525 A1 | 10/2013 | Fedor et al. | |
| 2014/0146732 A1 | 5/2014 | Olufunmilola et al. | |
| 2014/0161447 A1 * | 6/2014 | Graves | H04Q 11/0062 |
| | | | 398/48 |
| 2014/0321314 A1 | 10/2014 | Fodor et al. | |
| 2015/0134419 A1 | 5/2015 | Kandasamy et al. | |
| 2015/0163271 A1 | 6/2015 | Handuruksande et al. | |
| 2015/0230263 A1 * | 8/2015 | Roy | H04W 16/28 |
| | | | 455/452.2 |
| 2015/0257121 A1 | 9/2015 | Siomina et al. | |
| 2015/0373637 A1 | 12/2015 | Wang et al. | |
| 2016/0119902 A1 | 4/2016 | Cheong et al. | |
| 2016/0127006 A1 | 5/2016 | Majjigi et al. | |
| 2016/0173259 A1 | 6/2016 | Lee et al. | |
| 2016/0204910 A1 | 7/2016 | Kim et al. | |
| 2016/0269157 A1 | 9/2016 | Soriaga et al. | |
| 2016/0269158 A1 | 9/2016 | Soriaga et al. | |
| 2016/0270087 A1 | 9/2016 | Soriaga et al. | |
| 2016/0337872 A1 | 11/2016 | Alrabadi et al. | |
| 2016/0360361 A1 * | 12/2016 | Ross | H04W 4/023 |
| 2016/0380732 A1 | 12/2016 | Chung et al. | |
| 2017/0026156 A1 | 1/2017 | Thomas et al. | |
| 2017/0064518 A1 | 3/2017 | Kim et al. | |
| 2017/0094676 A1 * | 3/2017 | Kim | H04W 72/1205 |
| 2017/0099127 A1 | 4/2017 | Byun et al. | |
| 2017/0141823 A1 | 5/2017 | Fodor et al. | |
| 2017/0223655 A1 | 8/2017 | Huang et al. | |
| 2017/0223690 A1 | 8/2017 | Zeng et al. | |
| 2017/0238268 A1 | 8/2017 | Yang et al. | |
| 2017/0373890 A1 * | 12/2017 | Fertonani | H04L 25/02 |
| 2018/0091993 A1 * | 3/2018 | Siomina | H04W 24/10 |
| 2018/0192366 A1 * | 7/2018 | Bontu | H04W 52/143 |
| 2018/0287696 A1 * | 10/2018 | Barbieri | H04W 36/22 |
| 2019/0166538 A1 * | 5/2019 | Wong | H04W 36/32 |
| 2019/0357199 A1 * | 11/2019 | Ali | H04W 72/048 |
| 2020/0037330 A1 * | 1/2020 | Sharma | H04B 17/345 |

FOREIGN PATENT DOCUMENTS

| | | |
|---|---|---|
| EP | 3120601 A1 | 1/2017 |
| KR | 20170057853 A1 | 5/2017 |
| WO | 2010145427 A1 | 12/2010 |
| WO | 2015010339 A1 | 1/2015 |
| WO | 2016130403 A1 | 8/2016 |
| WO | 2017086922 A1 | 5/2017 |

OTHER PUBLICATIONS

Jinxing Li et al., "System Design and Calibration for Wideband Channel Sounding With Multiple Frequency Bands", IEEE Access 5 (2017). pp. 781-793.

"High Frequency and High Speed Design Engineers Unite in Boston", Microwave Journal, microwavejournal.com, Oct. 1, 2016. 15 Pages.

Koen Langendoen, "Medium access control in wireless sensor networks." Medium access control in wireless networks vol. 2 (2008). 22 Pages.

Ayman Elnashar et al., "Looking at LTE in practice: A performance analysis of the LTE system based on field test results", IEEE Vehicular Technology Magazine vol. 8, Issue 3 (2013). pp. 81-92. https://www.researchgate.net/profile/Ayman_Elnashar/publication/260654677_Looking_at_LTE_in_Practice_A_Performance_Analysis_of_the_LTE_System_Based_on_Field_Test_Results/links/56b0ad0008ae9ea7c3b1e552.pdf.

J. J. Kayra, "A Survey on the Effect of LTE Advanced on Drive Test Tool Requirements", signal 10.11: 12. 4 Pages. http://www.oamk.fi/~karil/mit_studies/wireless_future_seminar/papers2013/final_paper_kayra_janne.pdf.

Ionel Petrut et al., "User Experience Analysis on Real 3G/4G Wireless Networks", ACTA Electrotehnica vol. 56, No. 1-2, Mediamira Science Publisher (2015). pp. 131-134. http://ie.utcluj.ro/files/acta/2015/Number1-2/paper23_Petrut.pdf.

Nicholas Gresset et al., "Interference-avoidance techniques: Improving ubiquitous user experience", IEEE Vehicular Technology Magazine vol. 7, Issue 4 (2012). pp. 37-45. http://www.fr.mitsubishielectric-rce.eu/images/fck_upload/Gresset_VT12.pdf.

Duk-Sun Shim et al., "Application of Motion Sensors for Beam-Tracking of Mobile Stations in mmWave Communication Systems", Sensors vol. 14, No. 10 (2014). pp. 19622-19638. http://www.mdpi.com/1424-8220/14/10/19622/.

R. Mondal et al., "Performance evaluation of MDT assisted LTE RF fingerprint framework", 2014 Seventh International Conference on Mobile Computing and Ubiquitous Networking (ICMU) (2014). pp. 33-37. 10.1109/ICMU.2014.6799054. https://www.researchgate.net/publication/271462429_Performance_evaluation_of_MDT_assisted_LTE_RF_fingerprint_framework.

"Universal Mobile Telecommunications System (UMTS); LTE; Universal Terrestrial Radio Access (UTRA) and Evolved Universal

(56) References Cited

OTHER PUBLICATIONS

Terrestrial Radio Access (E-UTRA); Radio measurement collection for Minimization of Drive Tests (MDT); Overall description; Stage 2", 3GPP TS 37.320 version 12.2.0 Release 12, ETSI TS 137 V12.2.0 (2014). 27 Pages. http://www.etsi.org/deliver/etsi_ts/137300_137399/137320/12.02.00_60/ts_137320v120200p.

Azad Ravanshid et al., "Multi-connectivity functional architectures in 5G". 2016 IEEE International Conference on Communications Workshops (ICC) (2016). 6 Pages. https://5gnorma.5g-ppp.eu/dissemination/conference-papers/.

Paul Harris et al., "An overview of massive MIMO research at the University of Bristol", presented at the IET Radio Propagation and Technologies for 5G Conference (2016). 5 Pages. https://arxiv.org/abs/1705.07540.

\* cited by examiner

ND DRIVE TESTS IN
BEAMFORMED WIRELESS
COMMUNICATION SYSTEMS

The present disclosure relates generally to wireless communication networks, and more particularly to devices, non-transitory computer readable media, and methods for adjusting aspects of a cellular network in response to measurements of performance indicators by a mobile endpoint device at particular locations and orientations, and devices, non-transitory computer readable media, and methods for transmitting measurements of performance indicators by a mobile endpoint device, and the locations and orientations of the mobile endpoint device, to a cellular network.

BACKGROUND

Traditionally, cellular network coverage has been optimized through drive tests. Drive tests encompass a technician who drives a vehicle equipped with measurement devices to create a coverage map of the service area by correlating measurements of the received signal strength with the vehicle's location. The received signal strength may, for instance, be the reference signal received power (RSRP) and the measurement equipment may tag the measurements with the vehicle's geographic location by means of a Global Positioning System (GPS) receiver. However, such drive tests are costly and labor intensive. The Third Generation Partnership Project (3GPP) Long Term Evolution (LTE) wireless communications standard specifies a feature called Minimization of Drive Tests (MDT). For example, a user equipment (UE) may perform certain measurements in order to establish and maintain connectivity with the radio access network (RAN), such as RSRP. The MDT feature leverages the existing location based services available at the UE by tagging existing measurements with a location and time stamp, and logging measurements at the UE for later reporting to the network.

SUMMARY

In one example, the present disclosure discloses a method, computer-readable medium, and device for adjusting aspects of a cellular network in response to measurements of performance indicators by a mobile endpoint device at particular locations and orientations. For example, a method may include a processing system of a cellular network having a processor receiving, from a mobile endpoint device, a measurement of a performance indicator, a location, and spatial orientation information, the measurement of the performance indicator based upon at least one wireless signal from a base station of the cellular network, and adjusting at least one aspect of the cellular network in response to the measurement of the performance indicator, the location, and the spatial orientation information.

In another example, the present disclosure discloses a method, computer-readable medium, and device for transmitting measurements of performance indicators by a mobile endpoint device, and the locations and orientations of the mobile endpoint device, to a cellular network. For example, a method may include a processing system of a mobile endpoint device having a processor receiving at least one wireless signal from a base station of a cellular network, capturing a measurement of a performance indicator based upon the at least one wireless signal, and recording a location and spatial orientation information for the measurement of the performance indicator. The processing system may further transmit to the cellular network the measurement of the performance indicator, the location, and the spatial orientation information.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
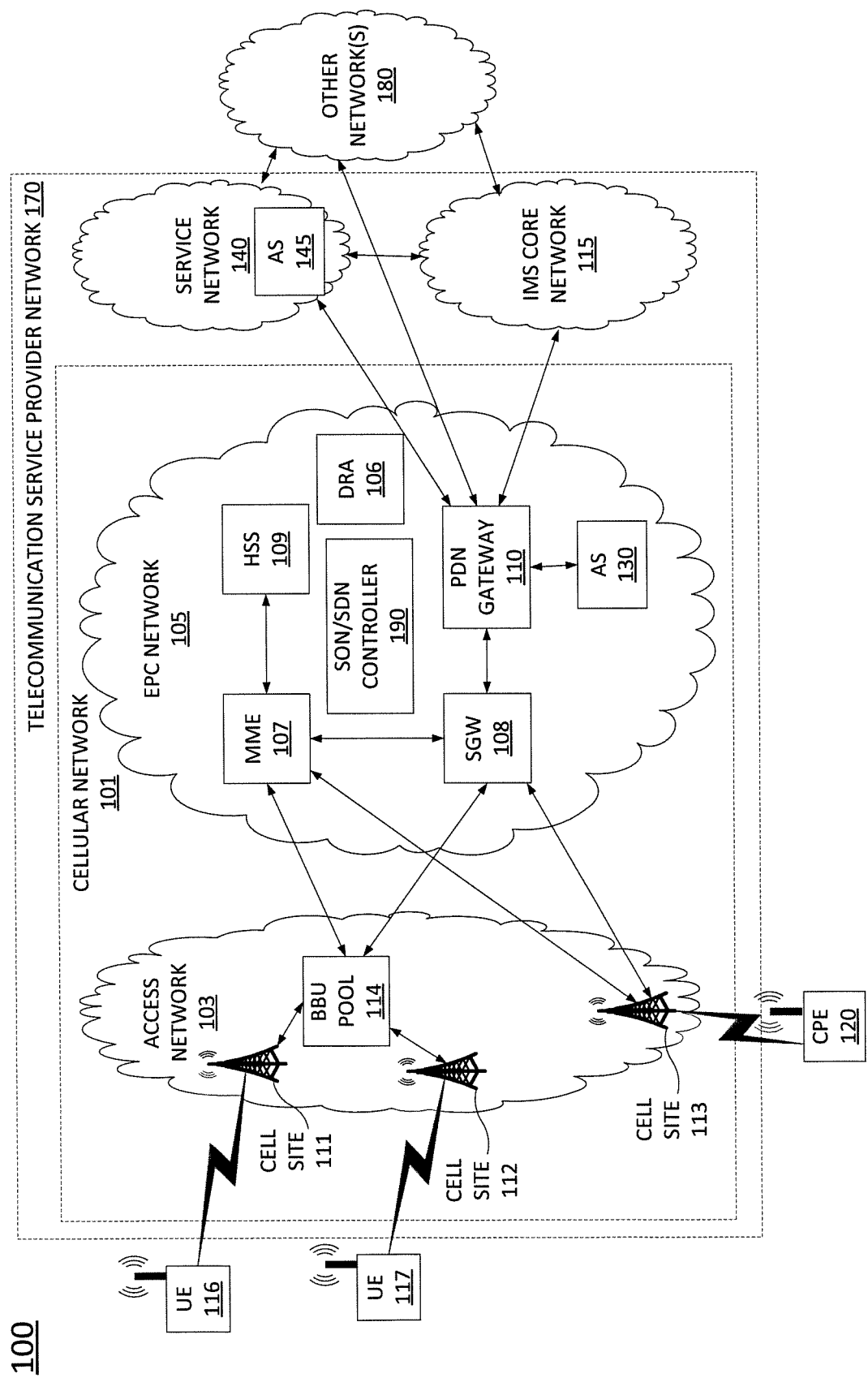
FIG. 1 illustrates a block diagram of an example system, in accordance with the present disclosure.

The present disclosure broadly discloses methods, computer-readable media, and devices for adjusting aspects of a cellular network in response to measurements of performance indicators by a mobile endpoint device at particular locations and orientations, and methods, computer-readable media, and devices for transmitting measurements of performance indicators by a mobile endpoint device, and the locations and orientations of the mobile endpoint device, to a cellular network.

Examples of the present disclosure utilize a mobile endpoint device, or user equipment (UE), to obtain and report measurements of performance indicators (e.g., one or more "key performance indicators" (KPIs)), such as signal strength measurements, along with spatial orientation information, such as azimuth and elevation angles, and locations associated with the measurements to the cellular network. The mobile endpoint device may comprise a user equipment (UE) that is equipped to operate according to the specification of the considered wireless cellular communications standard (e.g., 5G MIMO and/or millimeter wave). However, the mobile endpoint device may be configured with additional capabilities, including the ability to beam sweep the receive beam, and so on. The locations, or geographic positions may be determined at the mobile endpoint device via a Global Positioning System (GPS) receiver, or may be derived using other location estimation methods, such as cell identifier (cell ID) based methods, observed time difference of arrival (OTDA) techniques, or barycentric triangulation.

In one example, the mobile endpoint device may store a performance indicator measurement in a record, along with the spatial orientation information and a location associated with the performance indicator measurement, in a local memory until polled by the cellular network for transmission. In another example, the mobile endpoint device may indicate to the cellular network that it has one or more records of performance indicator measurements ready for transmission to the cellular network. In one example, the cellular network may configure the mobile endpoint device to collect the performance indicator measurements and associated spatial orientation information and locations.

For instance, the cellular network may configure the mobile endpoint device to start and stop collecting the performance indicator measurements (along with spatial orientation information and locations associated with the performance indicator measurements), to collect the performance indicator measurements (along with spatial orientation information and locations associated with the performance indicator measurements) while the mobile endpoint device is not connected to the cellular network, to collect a subset of performance indicator measurements that the mobile endpoint device is capable of collecting (along with spatial orientation information and locations associated with the performance indicator measurements), to report a subset of the performance indicator measurement records that the mobile endpoint device has collected, to utilize a particular location determination technique, and so on. In one example, the mobile endpoint device may indicate to the cellular network that it has location services available for the purpose of tagging performance indicator measurements with a location. In turn, the cellular network may configure, or instruct the mobile endpoint device to collect the performance indicator measurements, and spatial orientation information and locations associated with the performance indicator measurements. In one example, the mobile endpoint device may time stamp the performance indicator measurements. In another example, a time stamp associated with a performance indicator measurement may be implicit by the format in which the measurements are stored (e.g., sequentially in a database, where records in the database are associated with measurements taken at a given time interval).

Notably, the availability of millimeter wave spectrum for $3^{rd}$ Generation Partnership Project (3GPP) 5G deployments gives rise to many opportunities for telecommunications services in various frequency bands. In addition, 5G cellular networks call for the use of directional antennas for beamforming. Existing minimization of drive test (MDT) features are designed for cellular wireless communications systems that are not beamformed at all or where the beamforming of cell-specific signals and channels is transparent to the mobile endpoint device. For example, the mobile endpoint device may measure and average the reference signal received power (RSRP) without restriction, at least for intra-band measurements. In addition, even when measurement restrictions are configured at the mobile endpoint device, the measurement restrictions are for the purpose of enhanced inter-cell interference coordination (eICIC) and do not stem from any beamforming.

Examples of the present disclosure allow the cellular network to identify the radio conditions encountered by a mobile endpoint device, such as during beam failure and radio link interruption events, optimize the transmit beams at a given base station antenna, deploy new antennas that take into account the blocking of signals, adapt the locations of existing antennas, change how multiple antennas coordinate including no coordination, change the boresight of existing antenna arrays without changing the transmitters locations, minimize drive tests, reduce operating expenses and overhead associated with the collection of such measurements, and deploy technicians to fix reception issues based on the performance indicator measurements, spatial orientation information, and locations.

In one example, a mobile endpoint device performs synchronization signal (SS) block reference signal received power (RSRP) and/or channel state information (CSI)-RSRP measurements, e.g., as part of beam management (BM) and/or beam recovery (BR) procedures in accordance with a cellular communication protocol employed by the cellular network and implemented at the base station and the mobile endpoint device. In one example, the mobile endpoint device tags a SS block RSRP and/or CSI-RSRP measurement with a location tag. For instance, the location may be added to a record for the performance indicator measurement. The performance indicator measurements may be layer 1 (L1) or layer 3 (L3) filtered, beam-specific or cell-specific, and different combinations of measurement types may be collected and tagged by the mobile endpoint device with location information and spatial orientation information. To determine a location, the mobile endpoint device may use a GPS receiver, cell-ID, OTDA, or triangulation based techniques, and so forth. In one example, the mobile endpoint device may report its capabilities to infer location to the cellular network. Subsequently, the cellular network may instruct the mobile endpoint device which location-based technique to use to tag performance indicator measurements.

In accordance with the present disclosure, the mobile endpoint device tags a performance indicator measurement (e.g., a RSRP measurement with reference to a synchronization signaling (SS) block RSRP or channel state information (CSI) RSRP (CSI-RSRP) with directional/spatial orientation information, i.e., in addition to a location. For example, a mobile endpoint device may associate a SS block identifier (ID) with a RSRP measurement and the location of the measurement. Alternatively, the mobile endpoint device may associate a measurement configuration ID with the performance indicator measurement, e.g., in a record for the performance indicator measurement along with the location of the measurement. When uploaded to the cellular network, the cellular network may map the measurement configuration ID with a transmit beam that steered energy in a certain direction when transmitting the reference signal (RS) on which the reported performance indicator measurement was captured. For instance, the measurement configuration ID may be transmitted in the RS from which the performance indicator measurement is derived.

In yet another example, a mobile endpoint device may associate angle of arrival (AoA) with a performance indicator measurement (and a location), (e.g., where the performance indicator measurement relates to a received power). In one example, the mobile endpoint device does not tag a performance indicator measurement (e.g., received signal strength) with spatial orientation information, but rather tags spatial orientation information of a measurement with the location. For instance, at a given location, the primary direction from which the signal energy arrives is recorded, but not the actual received signal strength.

In one example, a mobile endpoint device may calculate a direction, or spatial orientation of a receive beam with respect to a local coordinate system, e.g., a three dimensional space with dimensions/axis aligned to a length, a width, and a depth of the mobile endpoint device, for example. In one example, a mobile endpoint device may include a phased array of antenna elements that may be manufactured and/or configured to provide a number of possible receive beams (or receive beam directions/spatial orientations) within a given azimuth and elevation range. In addition, in one example, the mobile endpoint device may be configured to associate each receive beam (or receive beam direction/orientation) with a vector/direction/spatial orientation in a local coordinate system that is fixed, e.g., with respect to the mobile endpoint device chassis. For instance, the mobile endpoint device may be configured with a mapping of receive beams to spatial orientations/directions in the local coordinate system.

It should be noted that other local coordinate systems may have a different alignment with respect to the mobile endpoint device (e.g., offset 30 degrees from the major dimensions/axis of the mobile endpoint device). In any case, a local orientation of a receive beam in a local coordinate system may be translated into a global orientation, e.g., in the global coordinate system. In one example, the translations may be based upon the difference between the local orientation and the global orientation, which can be estimated using a gyroscope and compass of the mobile endpoint device. The determination of a direction/orientation of a receive beam and the translation to a spatial orientation in a global coordinate system are described in greater detail below in connection with the example of FIG. 2.

In one example, the mobile endpoint device is configured with a beam recovery procedure upon detection of a beam failure from one or more monitored beams (e.g., if the quality of an associated control channel drops below a threshold and/or upon expiration of a configured timer/counter). For example, a beam recovery procedure may entail the transmission of a beam failure indication from the mobile endpoint device to the cellular network to trigger a transmission beam switch procedure in order to avoid entering a radio link failure (RLF) condition at the mobile endpoint device. In one example, the mobile endpoint device may log the beam failure and corresponding beam recovery attempts at the mobile endpoint device along with location(s) and spatial orientation information. In other words, in one example, a "performance indicator measurement" may be a notation of a radio link failure condition with respect to a particular directional beam. The record for a beam failure event may also include time stamp(s) associated with the beam failure event. In one example, a record of a beam recovery event may include one or more beam quality measurements/IDs corresponding to the beam(s) monitored by the mobile endpoint device during the beam recovery procedure, along with additional information, such as a modulation coding scheme (MCS) that was being utilized at the time of the event, and so forth.

In yet another example, a mobile endpoint device may experience situations where blockage events occur such that a link quality is impacted before quickly being restored (e.g., due to a vehicle passing between the mobile endpoint device and a base station) before beam recovery or radio link failure (RLF) procedures are completed, and so forth, such that those procedures are cancelled and the outcome is not reported to the cellular network. However, in accordance with the present disclosure these radio link interruption (RLI) events (e.g., the occurrence of the events, the locations of these events, and the spatial orientations of receive/transmit beams associated with these events) may be recorded at the mobile endpoint device and reported to the cellular network. The cellular network may utilize such information to adjust the configuration of beam management related measurement resources, timer/counters at the mobile endpoint device, or at mobile endpoint devices in general, and so on. The mobile endpoint device logs of such RLI events may include a time-stamp, location, and duration of the RLI event along with one or more beam quality measurements/IDs corresponding to the beam(s) monitored by the mobile endpoint device during the beam failure/recovery procedures. As part of the configuration, the mobile endpoint device may be provided with a RLI logging condition defined as a period of time during which a beam failure event has a duration less than a value "X" and is restored within a period of time "T."

In yet another example, the mobile endpoint device may be configured to record events related to random access channel (RACH) procedures, including location(s) and spatial orientation information, and report to the cellular network. The RACH event recording may also include a time stamp and other relevant parameters, such as a duration of a RACH failure event, RACH resources selected by the mobile endpoint device (e.g., preamble format, number of repetitions, time/frequency resources, etc.), transmission power, and transmit/receive (Tx/Rx) beamforming utilized at the mobile endpoint device. The recording and reporting provide the cellular network with information regarding RACH failure events that would otherwise not be reported to the cellular network. In addition, the cellular network may determine uplink coverage holes or gaps, adjust related RACH configuration parameters at the mobile endpoint device or base station (e.g., a gNodeB or gNB), and so on.

In one example, the mobile endpoint device may store records of performance indicator measurements in a local memory until polled by the cellular network for transmission. In one example, the mobile endpoint device is configured with a burst duration and a period. For instance, the burst duration may define the duration during which the mobile endpoint device shall collect consecutive performance indicator measurements and tag the measurements with location(s) and spatial orientation information, whereas the period defines the beginning of each burst. For instance, the mobile endpoint device may be configured to collect/tag performance indicator measurements for K1 milliseconds every K2 seconds. In another example, the mobile endpoint device may be configured to collect and tag performance indicator measurements only after a condition has been met (e.g., the measurement falls above or below a predefined threshold or a relative threshold, such as a 20 percent drop in received signal strength as compared to an average received signal strength in a preceding time period).

Alternatively, or in addition, the mobile endpoint device may indicate to the cellular network that it has records of performance indicator measurements ready for transmission. For example, the mobile endpoint device may allocate a limited amount of memory and/or storage for the records of performance indicator measurements. Accordingly, in one example the mobile endpoint device may indicate to the cellular network to poll the records of performance indicator measurements before the allocated memory and/or storage capacity is reached. In another example, the mobile endpoint device may collect performance indicator measurements, locations, and spatial orientation information while not connected to the network (e.g., in a radio resource control (RRC) idle (RRC_IDLE) mode). For instance, the mobile endpoint device may be preconfigured, or the cellular network may configure the mobile endpoint device to collect and tag performance indicator measurements while the mobile endpoint device is not connected to the cellular network. For example, the cellular network may configure the mobile endpoint device to begin the collection of measurements and the tagging of measurements with locations and spatial orientation information when the mobile endpoint device transitions from a RRC connected (RRC_CONNECTED) mode to an RRC_IDLE mode. Upon reconnection to the cellular network (e.g., an RRC_CONNECTED mode), the mobile endpoint device may signal to the cellular network the availability of records of performance indicator measurements. In one example, the mobile endpoint device may initiate a random access procedure to indicate to the cellular network the availability of records of performance indicator measurements. In another example, the mobile endpoint device may transmit a scheduling request. For instance, the mobile endpoint device may indicate in "message 3" of a random access procedure that the "cause" is "mobile originated data." Alternatively, the mobile endpoint device may indicate directly that the cause is the availability of the records of performance indicator measurements.

In one example, the cellular network may indicate to the mobile endpoint device to report only a subset of the records of performance indicator measurements (e.g., for measurements taken during an indicated time period or over a given duration, for measurements taken on one or more specific carriers, for measurements of one or more specified measurement types and/or performance indicators, and so forth). In addition, the cellular network may configure the mobile endpoint device to start or stop collecting performance indicator measurements (and to start and stop location information and spatial orientation information tagging of such measurements).

It should be noted that examples of the present disclosure are applicable to a mobile endpoint device which operate in a 5G standalone (SA) or non-standalone (NSA) "new radio" (NR) mode. In an example involving NSA mode, the mobile endpoint device may be configured with a master node (MN) which is a 4G/Long Term Evolution (LTE) eNB and a secondary node (SN) which is a 5G new radio gNB. In such an example, the mobile endpoint device may be configured to capture performance indicator measurements and to provide location and spatial orientation information tagging on one of more NR carriers by the MN via LTE RRC signaling. In addition, the records for such performance indicator measurements obtained with respect to the NR carrier(s) may be provided by the mobile endpoint device to the cellular network utilizing LTE signaling to the MN. For instance, LTE higher layer signaling (e.g., at the radio resource control (RRC) layer) may be utilized to control/configure the mobile endpoint device and to report performance indicator measurements along with associated location information and spatial orientation information back to the cellular network. Notably, using the LTE air interface for the control signaling may increase the range of the performance indicator measurements beyond what would be possible if it was solely operating in millimeter wave spectrum using NR technology. In another example, the configuration for the performance indicator measurement collection and tagging, and/or the configuration for subsequent reporting to the cellular network may be performed via dedicated signaling to the SN. In still another example, the mobile endpoint device may collect and tag performance indicator measurements on NR carriers of activated SN cells (e.g., during an ongoing NR data session) or may be configured or instructed to collect and tag performance indicator measurements on NR carriers when one or more SN cells are deactivated, or as part of an inter-frequency measurement configuration including the NR carriers.

In one example, the mobile endpoint device may detect and measure signals and channels related to initial access procedures (e.g., a primary synchronization signal (PSS), a secondary synchronization signal (SSS), a physical broadcast channel (PBCH), and/or a downlink modulation reference signal (DMRS) contained within a synchronization signaling (SS) block). In addition, in one example, the mobile endpoint device may not perform measurements relating to reception/transmission of control and data channels. Such an arrangement may enable basic coverage determination/optimization at a significantly lower overhead and power consumption than a mobile endpoint device implementing a full radio access protocol (e.g., a 5G NR access protocol). For instance, the mobile endpoint device may collect and tag performance indicator measurements without utilizing uplink transmission capabilities, except to report the records to the cellular network periodically or on demand. In this case, a performance indicator measurement configuration of the mobile endpoint device may be preconfigured/preloaded, or provided by dedicated signaling via another radio access technology (e.g., LTE). In another example, the mobile endpoint device may measure a reference signal (RS), or multiple reference signals, in addition to the SS-block, such as a channel station information reference signal CSI-RS, via a predetermined or preloaded configuration of the mobile endpoint device.

Although examples of the present disclosure are applicable to a wide range of frequency bands, in one example, the present disclosure may relate to centimeter and millimeter wave systems. For instance, for all of the examples herein, the considered wireless cellular communications standard can be the Third Generation Project (3GPP) New Radio (NR) and/or 5G radio access technology. For the examples herein, the base station can be a gNB or gNodeB or base station of a 5G-RAN (fifth generation radio access network). It should be noted that for illustrative purposes, various base station systems are described herein in connection with particular quantities or values. However, base station systems of the present disclosure may include different quantities of various components, and/or operating parameters which may have any number of different values. For instance, a base station system may have a different number transmit antennas, may have antennas with different beamwidths, may utilize different frequencies, may utilize different transmit powers, and so forth. In addition, a base station system may include a different number of antenna sector units covering a same or a different range in azimuth and/or elevation, may have sectors with different coverages, may have a different number of antenna elements per sector, may have a different desired SNRs, may utilize a fewer number of samples per antenna for a different averaging gain, and so forth. These and other aspects of the present disclosure are discussed in greater detail below in connection with the examples of FIGS. 1-5.

To better understand the present disclosure, FIG. 1 illustrates an example network, or system 100 in which examples of the present disclosure for adjusting aspects of a cellular network in response to measurements of performance indicators by a mobile endpoint device at particular locations and orientations, and/or for transmitting measurements of performance indicators by a mobile endpoint device, and the locations and orientations of the mobile endpoint device, to a cellular network may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure, any one or more of cell sites 111-113 may be deployed with antenna and radio infrastructures, including multiple input multiple output (MIMO) and millimeter wave antennas. Furthermore, in accordance with the present disclosure, a base station (e.g., cell sites 111-113 and/or baseband units within BBU pool 114) may comprise all or a portion of a computing device or system, such as computing system 500, and/or processing system 502 as described in connection with FIG. 5 below, and may be configured to provide one or more functions for adjusting aspects of a cellular network in response to measurements of performance indicators by a mobile endpoint device at particular locations and orientations, and for performing various other operations in accordance with the present disclosure. For instance, cell sites 111-113 and/or baseband units within BBU pool 114 may be configured to perform functions such as those described below in connection with the example methods of FIGS. 3 and 4.

Figure 5:
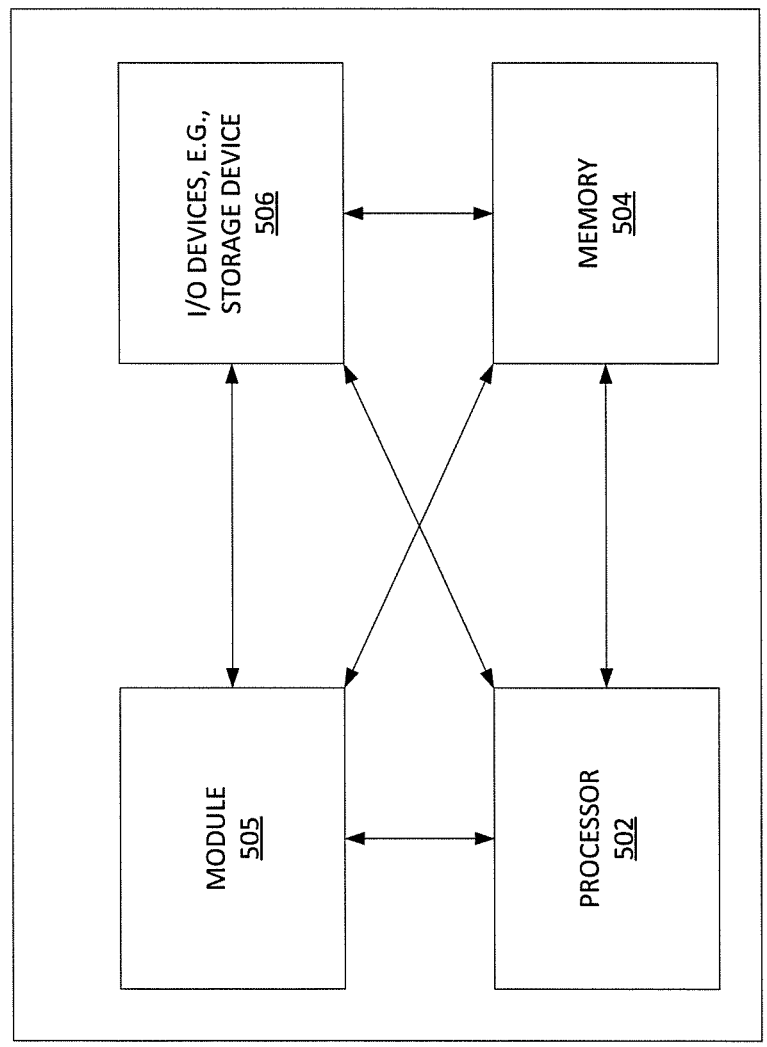
FIG. 5 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

As further illustrated in FIG. 1, CPE 120 may comprise a user equipment, e.g., a mobile endpoint device comprising a cellular telephone, a smartphone, a tablet computing device, a laptop computer, or any other cellular-capable mobile telephony and computing devices. In one example, CPE 120 may comprise a wireless transceiver for a fixed wireless broadband (FWB) deployment with one or more directional antennas (e.g., having a half-power azimuthal beamwidth of 120 degrees or less, 90 degrees or less, 60 degrees or less, etc.).

In one example, each of the UE 116 and 117, and the CPE 120 may comprise all or a portion of a computing device or system, such as computing system 500, and/or processing system 502 as described in connection with FIG. 5 below, and may be configured to provide one or more functions for transmitting measurements of performance indicators, locations, and orientations to a cellular network, and for performing various other operations in accordance with the present disclosure. For instance, UE 116, UE 117, and/or CPE 120 may be configured to perform functions such as those described below in connection with the example methods of FIGS. 3 and 4. In one example, each of UE 116, UE 117, and CPE 120 may also include a MIMO antenna to receive multi-path and/or spatial diversity signals, a gyroscope and compass to determine orientation(s), and so forth. In one example, UE 116, UE 117, and/or CPE 120 may further include a GPS for determining a location.

To illustrate, UE 116, UE 117, and/or CPE 120 may receive at least one wireless signal from one of cell sites 111-113, capture a measurement of performance indicator based upon the at least one wireless signal, record a location and spatial orientation information for the measurement of the performance indicator, transmit to the cellular network 101 the measurement of the performance indicator, the location, and the spatial orientation information, and so on. The at least one performance indicator may comprise a received signal strength, a bit error rate, a packet loss rate, a round trip time, a delay measure, a beam failure event, a radio link interruption event, a random access procedure failure event, or the like. The transmitting may be to the same one of cell sites 111-113 that transmits the at least one wireless signal, or may be to a different one of cell sites 111-113. For example, the UE 116, UE 117, and/or CPE 120 may collect a measurement of at least one performance indicator in an RRC_IDLE mode, and may transmit the measurement, along with a location and spatial orientation information, at a later time when the UE 116, UE 117, and/or CPE 120 reconnects to the cellular network 101, e.g., in an RRC_CONNECTED mode, which may involve a different cell site as the UE 116, UE 117, and/or CPE 120 moves throughout the environment.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more service functions in accordance with the present disclosure, such as a network-based secure data storage for performance indicator measurement records. For instance, cell sites 111-113 may collect performance indicator measurements along with associated locations and spatial orientation information, and any other optional information, such as time stamp information, (broadly "performance indicator measurement records") from UE 116, UE 117, and/or CPE 120, and may forward the performance indicator measurement records to AS 145 for storage. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190.

In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a mobile endpoint device or a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In one example, SON/SDN controller 190 may comprise all or a portion of a computing device or system, such as computing system 500, and/or processing system 502 as described in connection with FIG. 5 below, and may be configured to provide one or more functions for adjusting aspects of a cellular network in response to measurements of performance indicators by a mobile endpoint device at particular locations and orientations, and for performing various other operations in accordance with the present disclosure. For example, SON/SDN controller 190 may ensure that a cell site 111-113 and/or baseband unit of BBU pool 114 is provisioned with configuration code which, when executed by a processing system of the respective component(s), cause various operations in connection with the examples of FIGS. 3-4 to be performed. For instance, SON/SDN controller 190 may store such configuration code and provision the code to the respective component(s), or may direct the respective component(s) to obtain the configuration code from another repository.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of a mobile endpoint device is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure.

In one example, SON/SDN controller 190 may retrieve and process performance indicator measurement records from AS 145 where the records may be stored after collection via cell sites 111-113, and may adjust aspects of cellular network 101 in response to the measurements of performance indicators by UE 116, UE 117, and/or CPE 120 at particular locations and orientations, such as: activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, cell sites 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 500, and/or processing system 502 as described in connection with FIG. 5 below, and may be configured to perform various operations in connection with adjusting aspects of a cellular network in response to measurements of performance indicators by a mobile endpoint device at particular locations and orientations, and for performing various other operations in accordance with the present disclosure. For instance, AS 130 may receive from UE 116, UE 117, and/or CPE 120 a measurement of a performance indicator, a location, and spatial orientation information, and may adjust at least one aspect of the cellular network 101 in response to the measurement of the performance indicator, the location, and the orientation. In one example, the receiving may be via cell sites 111-113. In another example, the measurement of a performance indicator, the location, and the spatial orientation information may be stored in a record, e.g., at AS 145. As such, the receiving may comprise AS 130 retrieving the record from AS 145. In one example, the adjusting the at least one aspect of the cellular network 101 may comprise activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth. In one example, AS 130 may configure components of the cellular network 101 directly. For instance, AS 130 may maintain communications with BBU pool 114, cell sites 111-113, CPE 120, and so forth, via PDN gateway 110 and SGW 108, for example.

In another example, AS 130 may send a command or request to SON/SDN controller 190 for the SON/SDN controller 190 to configure the relevant component(s) of the cellular network 101. In this regard, it should be noted that some of the functions described herein with respect to SON/SDN controller 190 may instead be performed by AS 130, and vice versa. In addition, in one example, SON/SDN controller 190 and/or AS 130 may also configure UE 116, UE 117, CPE 120, etc. to perform various functions for transmitting measurements of performance indicators by a mobile endpoint device, and the locations and orientations of the mobile endpoint device, to a cellular network, in accordance with the present disclosure. For example, SON/SDN controller 190 and/or AS 130 may also configure UE 116, UE 117, and/or CPE 120 to collect measurements of a particular type of performance indicator, to utilize a particular location determination technique, to collect measurements with a particular periodicity, to report measurements with a particular periodicity, to report measurement records on demand, to report measurement records via a particular type of radio access technology (e.g., via LTE components of cellular network 101), to report measurement records when a measurement of a performance indicator exceeds a fixed or relative threshold, and so on.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additional be provided by AS 145.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for channel sounding via an in-service base station. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for adjusting aspects of a cellular network in response to measurements of performance indicators by a mobile endpoint device at particular locations and orientations, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
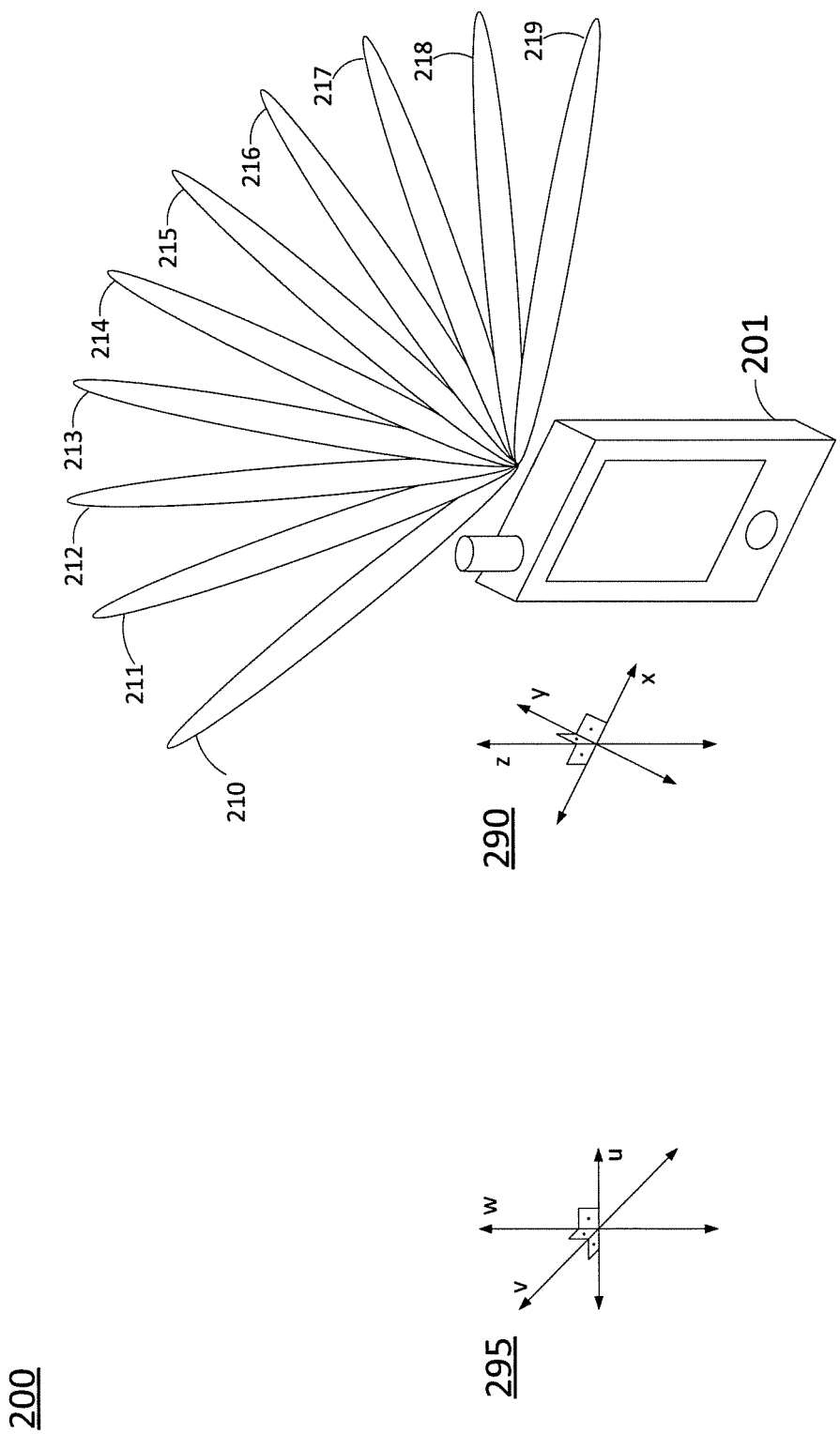
FIG. 2 illustrates an example translation of spatial orientation information of a local coordinate system with respect to a mobile endpoint device into spatial orientation information in a global coordinate system, in accordance with the present disclosure.

FIG. 2 illustrates an example translation of spatial orientation information of a local coordinate system with respect to a mobile endpoint device into a global coordinate system. In particular, FIG. 2 illustrates an environment 200 containing a mobile endpoint device 201. The orientation of mobile endpoint device 201 is illustrated with respect to local coordinate system 290 containing axis (x, y, z). A global coordinate system 295 having a different orientation and containing axis (u, v, w) is also illustrated in FIG. 2. The mobile endpoint device 201 may include a phased array antenna to receive multi-path and/or spatial diversity signals, e.g., via receive beams 210-219. Each of receive beams 210-219 may have different azimuth and elevation bearings from the other receive beams of receive beams 210-219. In one example, signals on receive beams 210-219 may be identified by receive beam indexes/indices or logical beam identifiers (beam IDs).

In one example, the mobile endpoint device 201 can identify a wireless signal on one of the receive beams 210-219 via voltage(s) and phase(s) in the receiver circuitry associated with one or more given antenna elements of a phased antenna array, or via a logical index associated with a respective receive beam 210-219. The mobile endpoint device 201 may also translate each of the receive beams 210-219 to a set of angles (or angles and magnitudes), n-tuples of coordinates defining a unit vector (or defining a magnitude and direction/orientation), or any other definitive units of local coordinate system 290, thereby giving the receive beams 210-219, identified with a logical "beam ID," a physical spatial direction/orientation with respect to the local coordinate system 290.

In one example, the local coordinate system 290 may be mapped or translated to the global coordinate system 295. For instance, global coordinate system 295 may have two dimensions corresponding to a planar estimation of the surface of the Earth (e.g., the "u" axis and "v" axis in FIG. 2), with the third dimension (e.g., the "w" axis) being normal to the plane. In addition, the planar estimation of the surface of the Earth can also be aligned such that one dimension is north-south (e.g., the "v" axis) and another dimension is east-west (e.g., the "u" axis). Accordingly, the orientations of the (x, y, z) axis of local coordinate system 290 relative to the (u, v, w) axis of global coordinate system 295 may be determined from a gyroscope and compass of the mobile endpoint device 201. The directions/orientations of the receive beams 210-219 may be similarly translated into directions/orientations in the global coordinate system 295 via the same mapping.

In one example, a location of mobile endpoint device 201 in local coordinate system 290 may be translated into a location in global coordinate system 295. For instance, mobile endpoint device 201 may estimate its position relative to several base stations/cell sites using observed time difference of arrival (OTDA). Once mobile endpoint device 201 determines its location relative to these base stations/cell sites, the mobile endpoint device 201 may then determine an absolute location (e.g., a latitude and a longitude) from the location relative to fixed known locations of the base stations/cell sites. However, in another example, the mobile endpoint device 201 may include a GPS receiver such that mobile endpoint device 201 may determine an absolute location (e.g., in global coordinate system 295) which may comprise a standard latitude and longitude.

For a given location in the local coordinate system 290 corresponding to a location in the global coordinate system 295, the mobile endpoint device 201 may collect a set of measurements of one or more performance indicators. For instance, for each spatial direction/receive beam direction 210-219, or for a subset of the receive beams 210-219, the mobile endpoint device 201 may perform a series of predefined or configurable measurements. For example, for each spatial direction/receive beam direction 210-219 the mobile endpoint device 201 may perform a cell search procedure. More precisely, the mobile endpoint device 201 may set the voltage and phase driving each antenna element of a phased antenna array according to a look up table where each entry corresponds to a receiver beam index, correlate a received waveform with a set of known sequences, determine for each correlation the received power, store the maximum received power, and determine the maximum received power for each receiver beam index in the look-up table. In other words, for the given location the mobile endpoint device 201 will sample the space according to the receiver beam directions in the look-up table. For each receiver beam direction 210-219, the mobile endpoint device 201 logs the received power. The mobile endpoint device 201 may use synchronization signals and/or a physical broadcast channel (PBCH) transmitted by a base station/cell site. This allows the mobile endpoint device 201 to determine the distribution of received power as sampled by the receiver beam direction 210-219. Furthermore, each performance indicator measurement may be associated with a position and orientation of the mobile endpoint device 201 (e.g., a UE and/or CPE).

Figure 3:
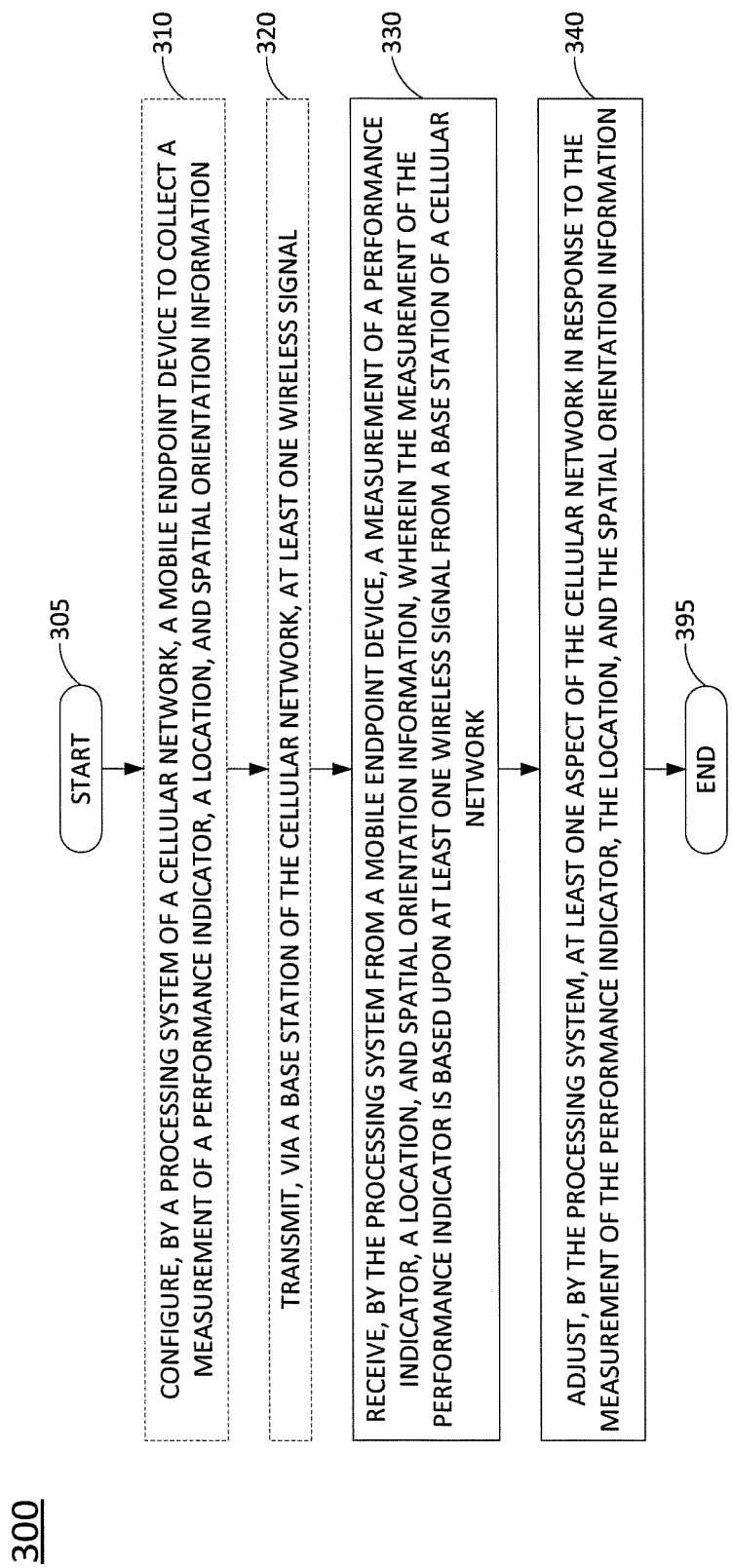
FIG. 3 illustrates a flowchart of an example method for adjusting aspects of a cellular network in response to measurements of performance indicators by a mobile endpoint device at particular locations and orientations.

FIG. 3 illustrates a flowchart of an example method 300 for adjusting aspects of a cellular network in response to measurements of performance indicators by a mobile endpoint device at particular locations and orientations, in accordance with the present disclosure. In one example, steps, functions and/or operations of the method 300 may be performed by a device as illustrated in FIG. 1, e.g., a base station, an application server, or a SON/SDN controller, or any one or more components thereof, such as a processing system, a processing system in conjunction with remote radio heads and/or antenna arrays, and so forth. Alternatively, or in addition, the steps, functions and/or operations of the method 300 may be performed by a processing system comprising a plurality of devices as illustrated in FIG. 1, such as an application server, a SON/SDN controller, a base station, a serving gateway, and so forth. In one example, the steps, functions, or operations of method 300 may be performed by a computing device or system 500, and/or a processing system 502 as described in connection with FIG. 5 below. For instance, the computing device 500 may represent at least a portion of an application server, a SON/SDN controller, a base station, and so forth, in accordance with the present disclosure. For illustrative purposes, the method 300 is described in greater detail below in connection with an example performed by a processing system, such as processing system 502. The method 300 begins in step 305 and may proceed to optional step 310, optional step 320, or to step 330.

At optional step 310, the processing system (e.g., of a cellular network) may configure a mobile endpoint device to collect a measurement of a performance indicator, a location, and spatial orientation information. For instance, the processing system may send an instruction to the mobile endpoint device to collect measurements of a particular type of performance indicator, to utilize a particular location determination technique, to collect measurements with a particular periodicity, to report measurements with a particular periodicity, to report measurement records on demand, to report measurement records via a particular type of radio access technology (e.g., via LTE components of the cellular network), to report measurement records when a measurement of a performance indicator exceeds a fixed or relative threshold, and so on. In one example, the instruction may be sent via at least one of: radio resource control signaling, preconfiguration signaling, or application layer signaling. In one example, the notification is sent via out-of-band signaling. For example, the configuration may be with respect to measurements of 5G new radio waveforms, while instructions and other signaling may be conveyed via 3G, 4G, or 4G/LTE infrastructure.

At optional step 320, the processing system may transmit at least one wireless signal, e.g., from a base station of the cellular network. For instance, in one example, the processing system may be a part of the base station. In another example, the processing system may send instructions to the base station to transmit the at least one wireless signal. The at least one wireless signal may comprise a signal (or a channel) related to initial access procedures, such as a primary synchronization signal (PSS), a secondary synchronization signal (SSS), a physical broadcast channel (PBCH), and/or a downlink modulation reference signal (DMRS)) contained within a synchronization signaling (SS) block). In one example, the at least one wireless signal may comprise a reference signal (RS), or multiple reference signals, as an alternative or in addition to the SS block, such as a channel station information reference signal CSI-RS. In one example, the at least one wireless signal is transmitted via a directional antenna, e.g., a phased array antenna for beamforming. Thus, the at least one wireless signal may be associated with a particular transmit beam or transmit beam direction (in azimuth and elevation) with respect to the phased antenna array. In one example, the at least one wireless signal may comprise a plurality of wireless signals, such as successive synchronization signals or reference signals over multiple bursts via the same or different transmit beams, and so forth.

At step 330, the processing system receives from a mobile endpoint device a measurement of a performance indicator, a location, and spatial orientation information. In one example, the measurement of the performance indicator is based upon at least one wireless signal from a base station of the cellular network (e.g., as described above in connection with optional step 320). In one example, the measurement of the performance indicator, the location, and the spatial orientation information may be received via radio resource control signaling, preconfiguration signaling, application layer signaling, or out-of-band signaling. In one example, the receiving may be via a different base station or cell site than the base station or cell site from which the at least one wireless signal is transmitted. The performance indicator may comprise a received signal strength, a bit error rate, a packet loss rate, a round trip time, a delay measure, a beam failure event, a radio link interruption event, a random access procedure failure event, or the like. In one example, the measurement of the performance indicator may be collected by the mobile endpoint device based upon a pre-configuration or based upon a configuration instruction received by the mobile endpoint device and sent by the processing system at optional step 310.

At step 340, the processing system adjusts at least one aspect of the cellular network in response to the measurement of the performance indicator, the location, and the spatial orientation information. For example, the adjusting the at least one aspect of the cellular network may include: activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth.

For instance, the processing system may determine that mobile endpoint devices in a given location may be subject to a relatively greater number of link failure events with respect to a cell site in a given direction/orientation from the area. For example, the location may be a sidewall across the street from a cell site, where there is a large amount of truck traffic which may temporarily block line-of-sight communications. In such case, the processing system may adjust a boresight of an antenna array of the base station e.g., using electro-mechanical elevation or azimuth tilt which may provide a relatively greater number of directional beams in other directions which may reach the mobile endpoint devices in the area via multiple alternative paths, e.g., reflections off of nearby buildings, and the like. In another example, there may be a remote radio head available on the same side of the street that may not be subject to the same path blocking as signals from the other base station. Therefore, step 340 may comprise activating a remote radio head to better serve the location. It should be noted that step 340 may comprise any number of different types of remedial actions to configure or reconfigure the cellular network in response to the measurement of the performance indicator, the location, and the spatial orientation information. Following step 340, the method 300 proceeds to step 395 where the method ends.

Figure 4:
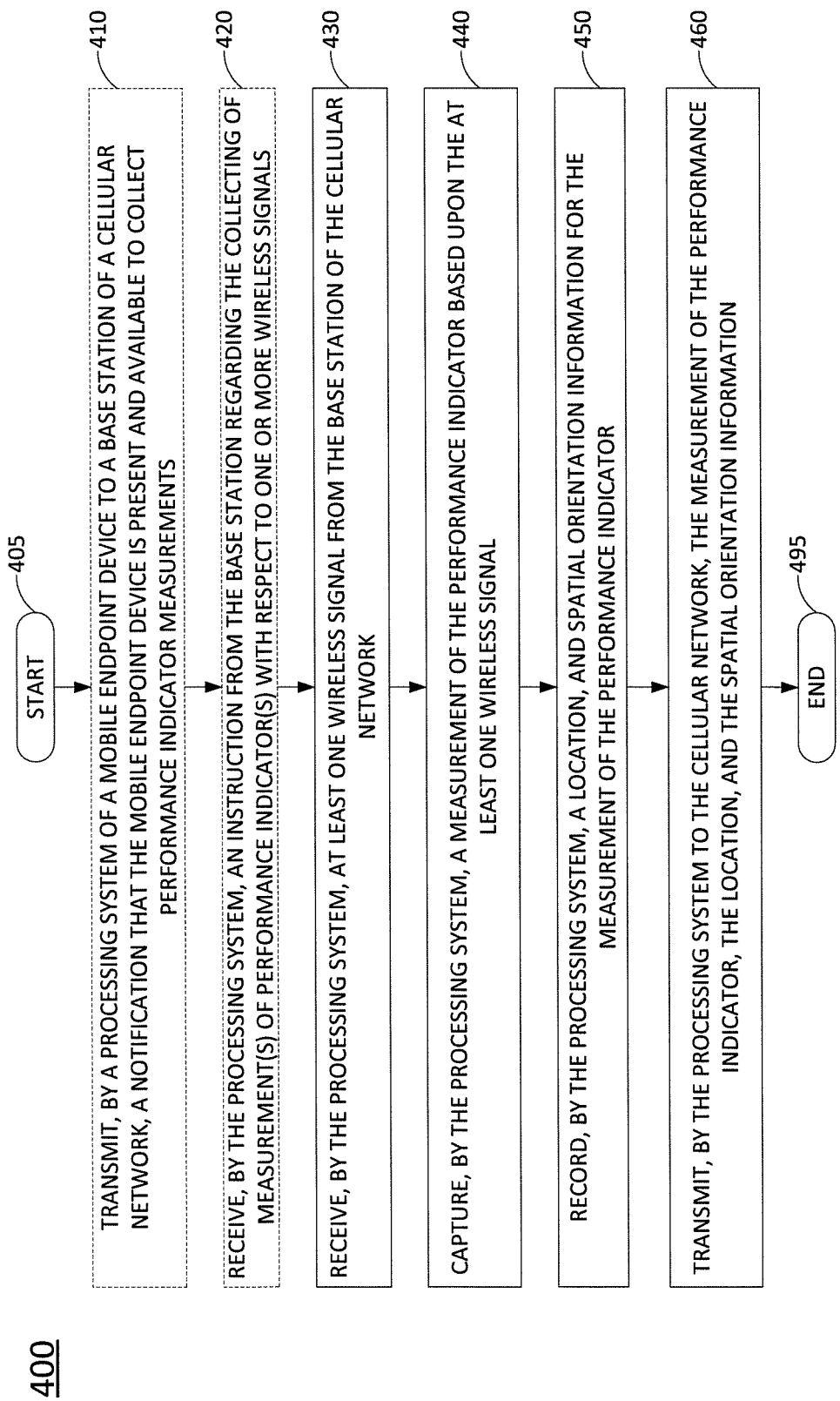
FIG. 4 illustrates a flowchart of an example method for transmitting measurements of performance indicators by a mobile endpoint device, and the locations and orientations of the mobile endpoint device, to a cellular network.

FIG. 4 illustrates a flowchart of an example method 400 for transmitting measurements of performance indicators by a mobile endpoint device, and the locations and orientations of the mobile endpoint device, to a cellular network, in accordance with the present disclosure. In one example, steps, functions and/or operations of the method 400 may be performed by a device as illustrated in FIG. 1, e.g., a mobile endpoint device and/or a UE, a customer premises equipment (CPE), or any one or more components thereof, such as a processing system, a Global Positioning System (GPS) unit, a phased antenna array, and so forth. In one example, the steps, functions, or operations of method 400 may be performed by a computing device or system 500, and/or a processing system 502 as described in connection with FIG. 5 below. For instance, the computing device 500 may represent at least a portion of a mobile endpoint device, UE, and/or CPE in accordance with the present disclosure. For illustrative purposes, the method 400 is described in greater detail below in connection with an example performed by a processing system, such as processing system 502. The method 400 begins in step 405 and may proceed to optional step 410, optional step 420, or to step 430.

At optional step 410, the processing system (e.g., of a mobile endpoint device) may transmit to a base station, a notification that the mobile endpoint device is present and available to collect performance indicator measurements. In one example, the notification may be sent via radio resource control signaling, preconfiguration signaling, application layer signaling, or out-of-band signaling (e.g., via LTE, where the performance indicator measurements may be with respect to 5G NR waveforms). In one example, the notification may indicate that the mobile endpoint device has a gyroscope and compass to determine spatial orientation information regarding receive and/or transmit beams, that the mobile endpoint device has location services activated and available to determine a location, and so on.

At optional step 420, the processing system may receive an instruction from the base station regarding the collecting of measurement(s) of performance indicator(s) with respect to one or more wireless signals. For instance, the cellular network may configure the mobile endpoint device to start and stop collecting the performance indicator measurements (along with spatial orientation information and locations associated with the performance indicator measurements), to collect the performance indicator measurements (along with spatial orientation information and locations associated with the performance indicator measurements) while the mobile endpoint device is not connected to the cellular network, to collect a subset of performance indicator measurements that the mobile endpoint device is capable of collecting (along with spatial orientation information and locations associated with the performance indicator measurements), to report a subset of the performance indicator measurement records that the mobile endpoint device has collected, to utilize a particular location determination technique, and so on.

At step 430, the processing system receives at least one wireless signal from a base station of a cellular network. The at least one wireless signal may comprise a signal (or a channel) related to initial access procedures, such as a primary synchronization signal (PSS), a secondary synchronization signal (SSS), a physical broadcast channel (PBCH), and/or a downlink modulation reference signal (DMRS)) contained within a synchronization signaling (SS) block). In one example, the at least one wireless signal may comprise a reference signal (RS), or multiple reference signals, as an alternative or in addition to the SS-block, such as a channel station information reference signal CSI-RS. In one example, the at least one wireless signal is transmitted via a directional antenna, e.g., a phased array antenna for beamforming. Thus, the at least one wireless signal may be associated with a particular transmit beam or transmit beam direction (in azimuth and elevation) with respect to the phased antenna array. In addition, the at least one wireless signal may be received via a particular receive beam, or receive beam direction) with respect to the mobile endpoint device. For instance, receive beams may be identified by receive beam indexes/indices or logical beam identifiers (beam IDs). In one example, the at least one wireless signal may comprise a plurality of wireless signals, such as successive synchronization signals or reference signals over multiple bursts via the same or different transmit beams, and so forth.

At step 440, the processing system captures a measurement of a performance indicator based upon the at least one wireless signal. In one example, the processing system may perform synchronization signal (SS) block reference signal received power (RSRP) and/or channel state information (CSI)-RSRP measurements, e.g., as part of beam management (BM) and/or beam recovery (BR) procedures in accordance with a cellular communication protocol employed by the cellular network. In one example, the capturing of the measurement of the performance indicator is in accordance with an instruction received at optional step 420. The performance indicator may comprise a received signal strength, a bit error rate, a packet loss rate, a round trip time, a delay measure, a beam failure event, a radio link interruption event, a random access procedure failure event, or the like.

At step 450, the processing system records a location and spatial orientation information for the measurement of the performance indicator. In one example, the location may be determined via a Global Positioning System (GPS) receiver, or may be derived using other location estimation methods, such as cell identifier (cell ID) based methods, observed time difference of arrival (OTDA) techniques, or barycentric triangulation. In one example, the location may comprise latitude and longitude coordinates. In one example, the processing system may calculate a direction/spatial orientation of a receive beam (e.g., a received beam on which the at least one wireless signal is received) with respect to a local coordinate system of the mobile endpoint device. For example, the processing system may associate each receive beam (or receive beam direction/spatial orientation) with a vector/direction/spatial orientation in a local coordinate system that is fixed, e.g., with respect to the mobile endpoint chassis. In addition, in one example, the processing system may translate the spatial orientation of the receive beam from a local coordinate system to a spatial orientation in a global coordinate system e.g., azimuth angles indicated with respect to 360 degrees, with 0/360 being north, magnetic north, or other reference standards, and elevation angles with respect to the horizon of the Earth. In one example, the translations may be based upon the difference between the local orientation and the global orientation, which can be estimated using a gyroscope and compass of the mobile endpoint device. In one example, at step 450, the processing system may further record a time associated with the measurement of the performance indicator.

At step 460, the processing system transmits to the cellular network the measurement of the performance indicator, the location, and the spatial orientation information. In one example, the transmitting is via radio resource control signaling, preconfiguration signaling, application layer signaling, or out-of-band signaling. In one example, the transmitting is to a different base station or cell site than the base station from which the at least one wireless signal is transmitted. For instance, the processing system may capture the measurement of the performance indicator and record a location and spatial orientation information associated with the measurement when the mobile endpoint device is in an RRC_IDLE mode and may transmit the measurement of the performance indicator, the location, and the spatial orientation information upon reconnection to the cellular network (e.g., an RRC_CONNECTED mode) at a different base station. In one example, step 460 may include the processing system signaling to the cellular network the availability of records of performance indicator measurements, receiving an instruction from the cellular network to transmit the records, and subsequently transmitting the records. Following step 460, the method 400 proceeds to step 495 where the method ends.

It should be noted that either of the methods 300 and 400 may be expanded to include additional steps or may be modified to include additional operations with respect to the steps outlined above. For example, the respective methods 300 and 400 may be repeated through various cycles of performance indicator measurements, various cycles of adjustments to a cellular network, and so forth. For instance, a mobile endpoint device may continue to move throughout an environment, capture measurements of performance indicators, locations, and spatial orientation information, and report back to the cellular network. In one example, steps 440 and 450 may include capturing a plurality of measurements of a performance indicator over multiple wireless signals, capturing measurements for a plurality of performance indicators with respect to the same wireless signals or different wireless signals, and tagging the measurements with associated locations and spatial orientation information in one or more locations. Similarly, step 330 may include receiving a plurality of measurements of a performance indicator with respect to multiple wireless signals, receiving measurements for a plurality of performance indicators with respect to the same wireless signals or different wireless signals, and so on. Step 340 may further include adjusting aspects of the cellular network in response to the plurality of measurements.

In addition, although not specifically specified, one or more steps, functions, or operations of the respective methods 300 and 400 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in either of FIGS. 3 and 4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for adjusting aspects of a cellular network in response to measurements of performance indicators by a mobile endpoint device at particular locations and orientations or for transmitting measurements of performance indicators by a mobile endpoint device, and the locations and orientations of the mobile endpoint device, to a cellular network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if any one or more of the methods 300 and 400 as discussed above are implemented in a distributed or parallel manner for a particular illustrative example, i.e., the steps of the above methods 300 or 400, respectively, or each of the entire methods 300 or 400, respectively, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 300 or 400 In one example, instructions and data for the present module or process 505 for adjusting aspects of a cellular network in response to measurements of performance indicators by a mobile endpoint device at particular locations and orientations or for transmitting measurements of performance indicators by a mobile endpoint device, and the locations and orientations of the mobile endpoint device, to a cellular network (e.g., a software program comprising computer-executable instructions) can be loaded into memory 504 and executed by hardware processor element 502 to implement the steps, functions, or operations as discussed above in connection with the illustrative methods 300 or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for adjusting aspects of a cellular network in response to measurements of performance indicators by a mobile endpoint device at particular locations and orientations or for transmitting measurements of performance indicators by a mobile endpoint device, and the locations and orientations of the mobile endpoint device, to a cellular network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving, by a processing system of a cellular network including at least one processor, from a mobile endpoint device, a measurement of at least one performance indicator, a location, and spatial orientation information, wherein the measurement of the at least one performance indicator is based upon at least one wireless signal from a base station of the cellular network, wherein the at least one wireless signal comprises a beamformed wireless signal that is transmitted via a first type of radio access architecture, wherein the at least one performance indicator comprises a radio link interruption event, and wherein the measurement of the at least one performance indicator is received by the processing system of the cellular network via a second type of radio access architecture that is different from the first type of radio access architecture, wherein the second type of radio access architecture utilizes non-beamformed wireless signals, wherein the second type of radio access architecture provides a greater communication range than the first type of radio access architecture; and
adjusting, by the processing system, an activation status of a baseband unit from a baseband unit pool comprising a plurality of baseband units of the cellular network in response to the measurement of the at least one performance indicator, the location, and the spatial orientation information.

2. The method of claim 1, wherein the receiving further comprises:
receiving a time stamp associated with the measurement of the at least one performance indicator.

3. The method of claim 1, wherein the at least one performance indicator further comprises at least one of:
a received signal strength;
a bit error rate;
a packet loss rate;
a round trip time;
a delay measure;
a beam failure event;
or
a random access procedure failure event.

4. The method of claim 3, wherein the received signal strength comprises a reference signal received power.

5. The method of claim 1, wherein the location is determined based upon a global positioning system of the mobile endpoint device.

6. The method of claim 1, wherein the location is determined is based upon time of arrival measurements at the mobile endpoint device.

7. The method of claim 1, wherein the spatial orientation information comprises a direction of a receive beam of the mobile endpoint device.

8. The method of claim 1, wherein the spatial orientation information is determined via a gyroscope and a compass of the mobile endpoint device.

9. The method of claim 1, wherein the receiving comprises receiving a plurality of measurements of the at least one performance indicator, a plurality of locations, and a plurality of spatial orientation information.

10. The method of claim 9, wherein the adjusting the activation status is based upon the plurality of measurements of the at least one performance indicator, the plurality of locations, and the plurality of spatial orientation information.

11. The method of claim 1 further comprising:
adjusting at least one aspect of the cellular network in response to the measurement of the at least one performance indicator, the location, and the spatial orientation information, wherein the adjusting the at least one aspect comprises:
activating a remote radio head;
deactivating a remote radio head;
changing a transmit power of a base station;
changing a boresight direction of an antenna array;
changing a beamwidth of a gain pattern of an antenna array;

changing a channel coding scheme availability at a base station; or changing a base station backhaul configuration.

12. A device comprising:
a processing system including at least one processor; and
a computer-readable medium storing instructions which, when executed by the processing system, cause the processing system to perform operations, the operations comprising:
receiving, from a mobile endpoint device, a measurement of at least one performance indicator, a location, and spatial orientation information, wherein the measurement of the at least one performance indicator is based upon at least one wireless signal from a base station of a cellular network, wherein the at least one wireless signal comprises a beamformed wireless signal that is transmitted via a first type of radio access architecture, wherein the at least one performance indicator comprises a radio link interruption event, and wherein the measurement of the at least one performance indicator is received by the processing system of the cellular network via a second type of radio access architecture that is different from the first type of radio access architecture, wherein the second type of radio access architecture utilizes non-beamformed wireless signals, wherein the second type of radio access architecture provides a greater communication range than the first type of radio access architecture; and
adjusting an activation status of a baseband unit from a baseband unit pool comprising a plurality of baseband units of the cellular network in response to the measurement of the at least one performance indicator, the location, and the spatial orientation information.

13. The device of claim 12, wherein the receiving further comprises:
receiving a time stamp associated with the measurement of the at least one performance indicator.

14. The device of claim 12, wherein the at least one performance indicator further comprises at least one of:
a received signal strength;
a bit error rate;
a packet loss rate;
a round trip time;
a delay measure;
a beam failure event; or
a random access procedure failure event.

15. A method, comprising:
receiving, by a processing system of a mobile endpoint device including at least one processor, at least one wireless signal from a base station of a cellular network, wherein the at least one wireless signal comprises a beamformed wireless signal that is transmitted via a first type of radio access architecture when the base station is deactivated from providing active communication sessions via the first type of radio access architecture to mobile endpoint devices;
capturing, by the processing system, a measurement of a performance indicator based upon the at least one wireless signal;
recording, by the processing system, a location, and spatial orientation information for the measurement of the performance indicator; and
transmitting, by the processing system to the cellular network, the measurement of the performance indicator, the location, and the spatial orientation information, wherein the transmitting comprises transmitting to a component of the cellular network that utilizes a second type of radio access architecture that is different from the first type of radio access architecture, wherein the second type of radio access architecture utilizes non-beamformed wireless signals, wherein the second type of radio access architecture provides a greater communication range than the first type of radio access architecture, wherein the base station comprises a gNodeB, and wherein the component of the cellular network that utilizes the second type of radio access architecture comprises an eNodeB.

16. The method of claim 15, wherein the recording further comprises:
recording a time stamp associated with the measurement of the performance indicator.

17. The method of claim 16, wherein the transmitting further comprises:
transmitting the time stamp to the cellular network.

18. The method of claim 15, wherein the spatial orientation information comprises a direction of a receive beam of the mobile endpoint device.

19. The method of claim 15, wherein the spatial orientation information is determined via a gyroscope and a compass of the mobile endpoint device.

* * * * *